United States Patent
Shlomai

(10) Patent No.: US 7,600,216 B2
(45) Date of Patent: Oct. 6, 2009

(54) METHOD FOR EXECUTING SOFTWARE APPLICATIONS USING A PORTABLE MEMORY DEVICE

(75) Inventor: Netzer Shlomai, Ra'anana (IL)

(73) Assignee: GTEKO, Ltd, Ra' Anana (IL)

( * ) Notice: Subject to any disclaimer, the term of this patent is extended or adjusted under 35 U.S.C. 154(b) by 674 days.

(21) Appl. No.: 11/110,806

(22) Filed: Apr. 21, 2005

(65) Prior Publication Data
US 2005/0240918 A1 Oct. 27, 2005

Related U.S. Application Data

(60) Provisional application No. 60/564,243, filed on Apr. 22, 2004.

(51) Int. Cl.
*G06F 9/44* (2006.01)
(52) U.S. Cl. .................................................. 717/111
(58) Field of Classification Search ......... 717/162–163, 717/174–178, 111; 719/319; 715/744, 747
See application file for complete search history.

(56) References Cited

U.S. PATENT DOCUMENTS

| | | | | |
|---|---|---|---|---|
| 5,355,469 A | * | 10/1994 | Sparks et al. ................. | 714/38 |
| 5,437,033 A | * | 7/1995 | Inoue et al. .................... | 714/10 |
| 5,699,275 A | * | 12/1997 | Beasley et al. ............... | 709/221 |
| 5,758,154 A | * | 5/1998 | Qureshi ......................... | 713/1 |
| 6,006,035 A | | 12/1999 | Nabahi | |
| 6,507,875 B1 | * | 1/2003 | Mellen-Garnett et al. ... | 719/310 |
| 6,760,908 B2 | * | 7/2004 | Ren ............................ | 717/173 |
| 6,912,591 B2 | * | 6/2005 | Lash ........................... | 709/246 |
| 6,926,199 B2 | * | 8/2005 | Jay et al. ..................... | 235/375 |
| 7,299,422 B2 | * | 11/2007 | Levine et al. ................ | 715/789 |
| 2002/0055924 A1 | * | 5/2002 | Liming ........................ | 707/100 |
| 2003/0074605 A1 | * | 4/2003 | Morimoto et al. ............. | 714/38 |
| 2003/0161193 A1 | | 8/2003 | Moran et al. | |
| 2003/0182463 A1 | * | 9/2003 | Valk ............................ | 709/310 |
| 2004/0001088 A1 | * | 1/2004 | Stancil et al. ................ | 345/748 |
| 2004/0046785 A1 | * | 3/2004 | Keller ......................... | 345/734 |
| 2004/0095382 A1 | * | 5/2004 | Fisher et al. ................. | 345/744 |
| 2004/0139309 A1 | * | 7/2004 | Gentil et al. .................... | 713/1 |
| 2005/0169073 A1 | * | 8/2005 | Cook et al. .................. | 365/202 |

OTHER PUBLICATIONS

Oliveira et al. "An Innovative Design Approach to Build Virtual Environment Systems", May 2003, ACM, EGVE'03, pp. 143-151.*
Kanter "Going Wireless, Enabling an Adaptive and Extensible Environment", Feb. 2003, Kluwer Academic Publishers, Mobile Networks and Applications, vol. 8 Issue 1, pp. 37-50.*

* cited by examiner

*Primary Examiner*—Wei Y Zhen
*Assistant Examiner*—Anna Deng
(74) *Attorney, Agent, or Firm*—Lee & Hayes, PLLC

(57) ABSTRACT

A method for executing a plurality of software applications using a portable memory device, which is equipped with execution files and a virtual registry file of a software application to be executed. Once the portable memory device is plugged into a computer, the presence of the device is automatically detected, and thereafter the application programmable interface (API) calls are mapped to access the virtual registry file and the execution files, thereby allowing the execution of the application residing on the portable memory device.

23 Claims, 3 Drawing Sheets

METHOD FOR EXECUTING SOFTWARE APPLICATIONS USING A PORTABLE MEMORY DEVICE

CROSS-REFERENCE TO RELATED APPLICATIONS

This application claims priority under 35 U.S.C. § 119 from U.S. Provisional Patent Application No. 60/564,243 filed on Apr. 22, 2004, which is incorporated by reference in its entirety.

TECHNICAL FIELD OF THE INVENTION

The present invention relates generally to the execution of software applications, and more particularly to a method for executing software applications on a portable memory device.

BACKGROUND OF THE INVENTION

Personal computers (PCs) serve a multitude of software applications, features and functions. The applications provide the user with tools to accomplish tasks, such as (but not limited to) document processing, spreadsheet management, email exchanges and Internet browsing. The features and functions are commonly referred to as the "personalized information" and may comprise favorite Internet websites, contacts, Internet cookies, digital signatures, background images, desktop icons, application control bars, choice of default values and other configurable settings. In general, the personalized information differs from one user to another.

Typically, software applications are installed and setup using an automated installation process. The installation process is designed to enable the integration of the new functionality into its overall organization by the operating system (OS), as well as ensuring that the application can be safely removed. Still, as installation process is mostly carried-out by automatic installation programs, installation and setup of software applications remain a tedious task requiring as much as hours of work.

Generally, an automatic installation program performs the following activities: a) copying application software files from a removable storage (e.g., a compact disk) to the destination computer; b) configuring the operating system's parameters by, for example, the configuration of the system registry files; c) creating the application icons; and d) deleting temporary installation files.

Normally, software applications are executed exclusively within the environment in which they were actually installed. Specifically, a software application ought to be installed on each computer that runs the application. As a result, a user cannot switch between computers and work with his common applications without installing and registering those applications on each computer. Moreover, the user has to configure the personalized information when switching between computers.

Therefore, it would be highly desirable for a user to have a portable memory device that comprises one or more common applications and the corresponding personalized information. Such a portable memory device would allow the user to run his common applications and uploading its personalized information just by plugging the device to any computer.

SUMMARY OF THE INVENTION

The invention has been made in view of the above circumstances and has an object to overcome the above problems and limitations of the prior art. Additional aspects and advantages of the invention will be set forth in part in the description that follows and in part will be obvious from the description, or may be learned by practice of the invention. The aspects and advantages of the invention may be realized and attained by means of the instrumentalities and combinations particularly pointed out in the appended claims.

A first aspect of the invention provides a method for executing one or more software applications on a portable memory device by a computing device. The method comprises providing the portable memory device with virtual registry files and execution files associated with the one or more software applications. When the portable memory device is plugged into a computing device, system calls to access the execution files and registry files stored in portable memory device are mapped by the operating system of the computing device. If a system call can not be served by the execution files and/or the registry file, the system register file is accessed. The virtual registry file comprises system information describing how to execute the one or more software applications, and is derived from a system registry file. Execution files may be one or more of EXE file types, DLL file types, a SYS file types and/or data files.

A second aspect of the invention provides a computer program product for executing one or more software applications on a portable memory device by a computing device. The computer program product contains executable code capable of providing the portable memory device with virtual registry files and execution files associated with the one or more software applications. When the portable memory device is plugged into a computing device, system calls to access the execution files and registry files stored in portable memory device are mapped by the operating system of the computing device. If a system call can not be served by the execution files and/or the registry file, the system register file is accessed. The virtual registry file comprises system information describing how to execute the one or more software applications, and is derived from a system registry file. Execution files may be one or more of EXE file types, DLL file types, a SYS file types and/or data files.

A third aspect of the invention is a portable memory device capable of executing one or more software applications by a computing device. The portable memory device comprises a non-volatile memory containing virtual registry files and execution files associated with the one or more software applications, and a data bus interface compatible with the computing device. The virtual registry files comprise system information describing how to execute the one or more software applications, and are derived from a system registry file. The execution files are one or more of EXE files, DLL files, SYS files and/or data files. The execution of the one or more software applications comprises mapping system calls to access the execution files and the registry files when the portable memory device is plugged to a computing device. The system register file is accessed if a system call can not be served by the execution files and the registry files. System calls are requests generated then operating system operating on a computing device.

The computing device comprises a data bus that is compatible with the portable memory device. Suitable data buses can be universal serial buses, parallel buses and peripheral component interconnect buses. The computing device itself may be one of a personal computer, a personal digital assistant, a handheld computer, a notebook computer and/or a networked device (e.g., a wired router, a wireless router and/or a network a switch).

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings.

DETAILED DESCRIPTION OF THE INVENTION

A detailed description of the invention will now be given referring to the accompanying drawings.

The present invention provides a method that allows a user to run his common applications and uploading its personalized information from a portable memory device that comprises one or more common applications and the corresponding personalized information. Therefore, by using the present invention, the need to reinstall applications and configure the personalized information when switching between computing devices is eliminated.

Figure 1:
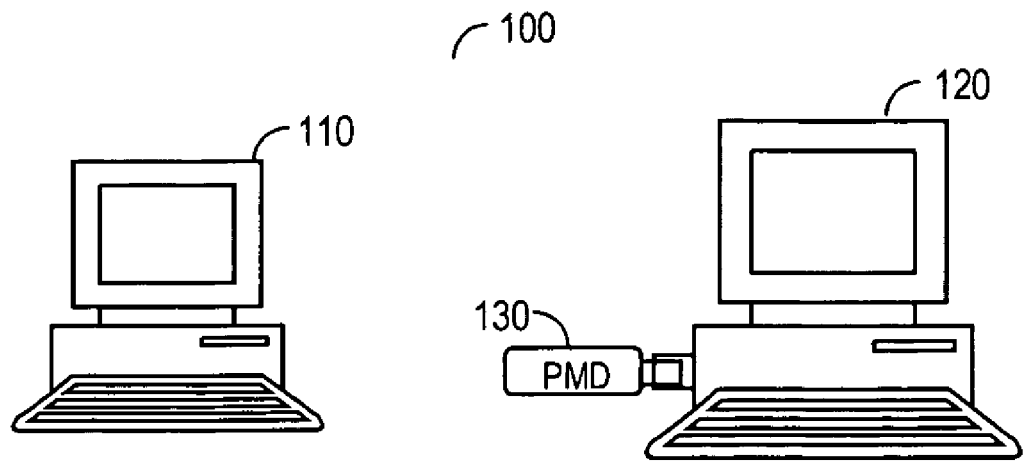
FIG. 1 is an exemplary computer system illustrating the principles of the present invention.

Referring to FIG. 1, an exemplary computer system 100 illustrating the principles of the present invention is shown. The computer system 100 comprises two independent computing devices 110, 120 and a portable memory device (PMD) 130. The computing devices 110, 120 may be, but are not limited to, desktops, notebooks, personal digital assistants (PDAs) and other computing devices. The PMD 130 preferably comprises a connector and a non-volatile memory, such as in the form of flash memory, read-only memory, other types of memory or any combinations thereof. The connector of PMD 130 is compatible with a data bus including, but not limited to, a universal serial bus (USB), a parallel bus, a PCI bus or other types of bus connectors and/or protocols. The computing devices 110, 120 comprise at least one port (not shown) that is compatible with the connector of PMD 130, e.g., a USB port. The memory capacity of PMD 130 can be any capacity sufficient to store the applications' execution files, a virtual registry file, the personalized information or any other desired data.

In an embodiment of the present invention, the PMD 130 may be a DiskOnKey™ device, such as provided by M-Systems, adapted to operate in accordance with disclosed invention. Currently, such devices have 512 Mbytes and more of memory capacity, which is sufficient to store the files necessary for the applications and registry files. It should be noted that the PMD 130 comprises solid-state memory for its storage medium and does not require a disk drive to access the data contained therein, and therefore, it ensures the fast execution of the software applications, unlike external or even internal hard disk drives.

The execution files and the virtual registry file required to execute an application, as well as the personalized information, are copied from computing device 110 to the non-volatile memory of the PMD 130. The PMD 130 can then be taken to computing device 120, connected thereto and the application stored in the PMD 130 can be executed directly on the PMD 130. Additionally, the personalized information can be uploaded into the computing device 120 setting it with the user's personalized computing environment. The personalized information comprises, but is not limited to, Internet favorites, Internet cookies, contacts, calendar information, digital certificates, passwords, desktop icons, toolbar configuration, color schemes and other configurable items.

The computing device 120 automatically recognizes the presence of the PMD 130 in accordance with conventional plug and play techniques. Once the presence of the PMD 130 is detected, the personalized information is automatically uploaded to the computing device 120 and an icon associated with the application stored in the PMD 130 is displayed on device 120. The user can then run the application by clicking on the icon activating the desired application. Uploading the personalized information to the computing device 120 allows the generation of computing environment familiar to the user.

In one configuration, the application can run immediately after the PMD 130 is connected to the computing device 120. In this configuration, an initiator code is comprised in the PMD 130. The initiator code is an executable code that runs automatically when the PMD 130 is connected to the computing device 120. The initiator code causes a predetermined application to begin running without the user involvement. Once the PMD 130 is disconnected (or accidentally forced out) from the computing device 120, the disclosed method removes the personalized information as well as residual data generated during the application runtime from the computing device 120.

In order to allow the execution of a software application from the PMD 130 by a computing device 120, the PMD 130 should include the application's execution files and a virtual registry file of the software application. The execution files are the outcome of the installation process and may comprise, for example, EXE files, DLL files, SYS files and data files. The virtual registry file comprises system information describing how to execute the application. The virtual registry file is derived from the system registry and configured to allow the execution of the software applications stored in the PMD 130. A detailed description of the virtual registry file and the system registry is provided below.

The disclosed invention provides several embodiments to equip the PMD 130 with the execution files and the virtual registry file of a single application. In a first embodiment, a user installs the application on the PMD 130 through a standard installation process. For example, the user can plug the PMD 130 to the computing device 110 and install the application on the PMD 130 using installation software from a compact disk (CD) drive of the computing device 110. Once the installation process completes, a virtual registry file is created by deriving only the information required to run the application installed in the PMD 130 and configuring the derived information in a way that allows the execution on the PMD 130. As described above, the virtual registry file comprises only the information required to run the application.

In a second embodiment of, a procedure that automatically copies the execution files from the computing device (e.g., the computing device 110) to the PMD 130 is provided. This procedure further creates the virtual registry file and saves it in the PMD 130. The procedure accesses a directory comprising the execution files of the desired application and copies these files to the PMD 130.

In a third embodiment, a software vendor pre-installs the execution files and the virtual registry file of a specific software application on the PMD 130. In this embodiment, the PMD 130 can be sold as a device that comprises a software package. It may be further configured such that it auto-installs without any intervention from the user.

The virtual registry file is generated by monitoring the values writing to the system registry file while the application is being installed in computing device 110. These registry values are simultaneously time written to a virtual registry file.

Figure 2:
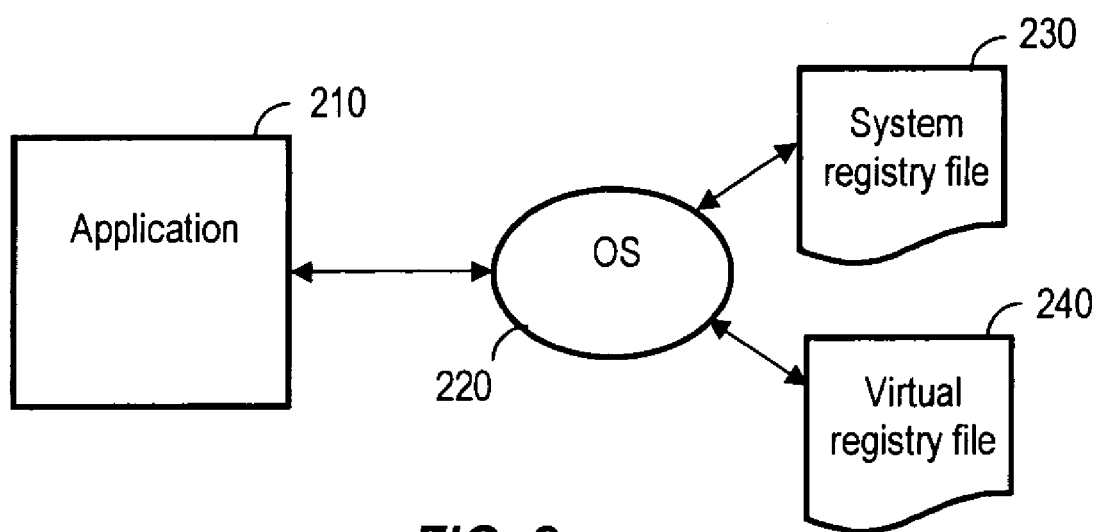
FIG. 2 is an exemplary schematic diagram illustrating the execution of software applications on a personal memory device according to an embodiment of the present invention.

Referring to FIG. 2, a schematic diagram illustrating the execution of a software application on the PMD 130 by a computing device 120 is shown. A software application 210 is executed on the PMD 130 by the operating system (OS) 220 of a computing device into which the PMD 130 is plugged. A system registry file 230 comprises a hierarchical database of user and system information and is maintained by the computing device. Specifically, the system registry file 230 contains hardware configuration information, system software configuration information, user security information, current user information and application configuration information. Any application can write and read data to and from the system registry file 230. The system registry file 230 is structured as a hierarchy of keys, sub keys and values. The keys may have multiple sub keys and values. A virtual registry file 240 is derived from the system registry file 230 and configured to allow the execution of the application 210 on the PMD 130.

The virtual registry file 240 comprises the information necessary for the OS 220 to execute the application 210. Specifically, the virtual registry file 240 determines which keys to superimpose in the system registry file 230. For example, one of the keys defined in a system registry is the HKEY_USERS key, which comprises two sub-keys with the user setting information the HKEY_USERS\DEFAULT and the HKEY_CURRENT_USER sub-keys. The HKEY_USERS\DEFAULT sub-key contains system default settings that are used when a "logon" screen is displayed. The HKEY_CURRENT_USER sub-key contains the user-personalized information. To allow the execution of the application 210 with the user-personalized information, the HKEY_USERS key and the HKEY_CURRENT_USER sub-key with their appropriate values are added to the virtual registry file 240. The virtual registry file 240 has the same structure as system registry file 230, i.e., a hierarchy of keys, sub keys and values. As for another example, the SECURITY sub-key which contains information about specific user permissions for user and group accounts. Once the PMD 130 is plugged, the content of the SECURITY sub-key is overwritten of with local security account policy information. Generally, the registry keys to be overwritten are determined by the OS 220 type and the application 210 executed on PMD 130.

The application 210 can use entries either from the system registry file 230 or the virtual registry file 240. The virtual registry file 240 is looked up first for a desired key, and if no match is found, the system registry file 230 is used. When a user executes an application residing on the PMD 130, all application programming interface (API) calls of the OS 220 are mapped to access the execution files of the application 210 stored in the PMD 230.

Figure 3:
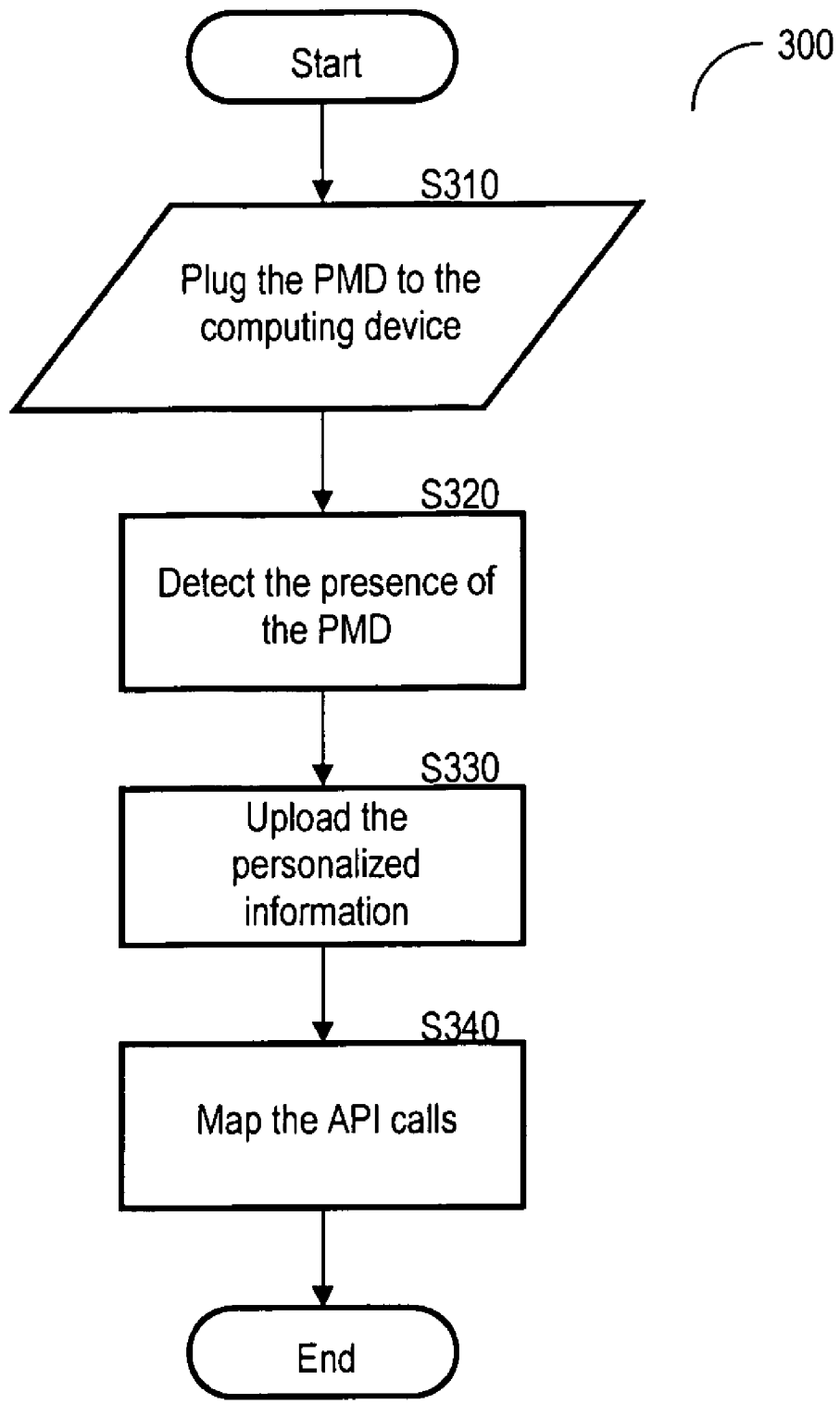
FIG. 3 is a non-limiting flowchart describing the method for executing software applications on a personal memory device according to an embodiment of the present invention.

Referring to FIG. 3, a non-limiting flowchart 300 describing the method for executing a plurality of software applications on a PMD in accordance with the present invention is shown. For reasons of clarity, only the process of executing a single application stored in the PMD is provided. At S310, the user plugs the PMD (e.g., PMD 130) to a computing device (e.g., computing device 120), where the user desires to run an application. At S320, upon connecting the PMD into the computing device, the presence of the PMD is detected. At S330, optionally, the personalized information is uploaded and temporarily saved in the computing device. At S340, the API system calls are rerouted to access the execution files and the virtual registry file stored on the PMD and associated with the application to be executed. At runtime, if the operating system requests the value of a specific key or sub-key, this value is first search for in the virtual registry file and if not found, then the operating system searches for the requested value in system registry file. Once the PMD is disconnected from the computing device the personalized information and any residual data generated during runtime, are removed from the computing device. Furthermore, the system registry values that are overwritten by the detection of the PMD returned to their previous settings once the PMD is removed from the system.

It should be emphasized that the applications stored in the PMD are executed on the PMD and no data is transferred to the computing device in which the PMD is connected. However, the data generated by the application residing on the PMD may be stored on the PMD.

Figure 4:
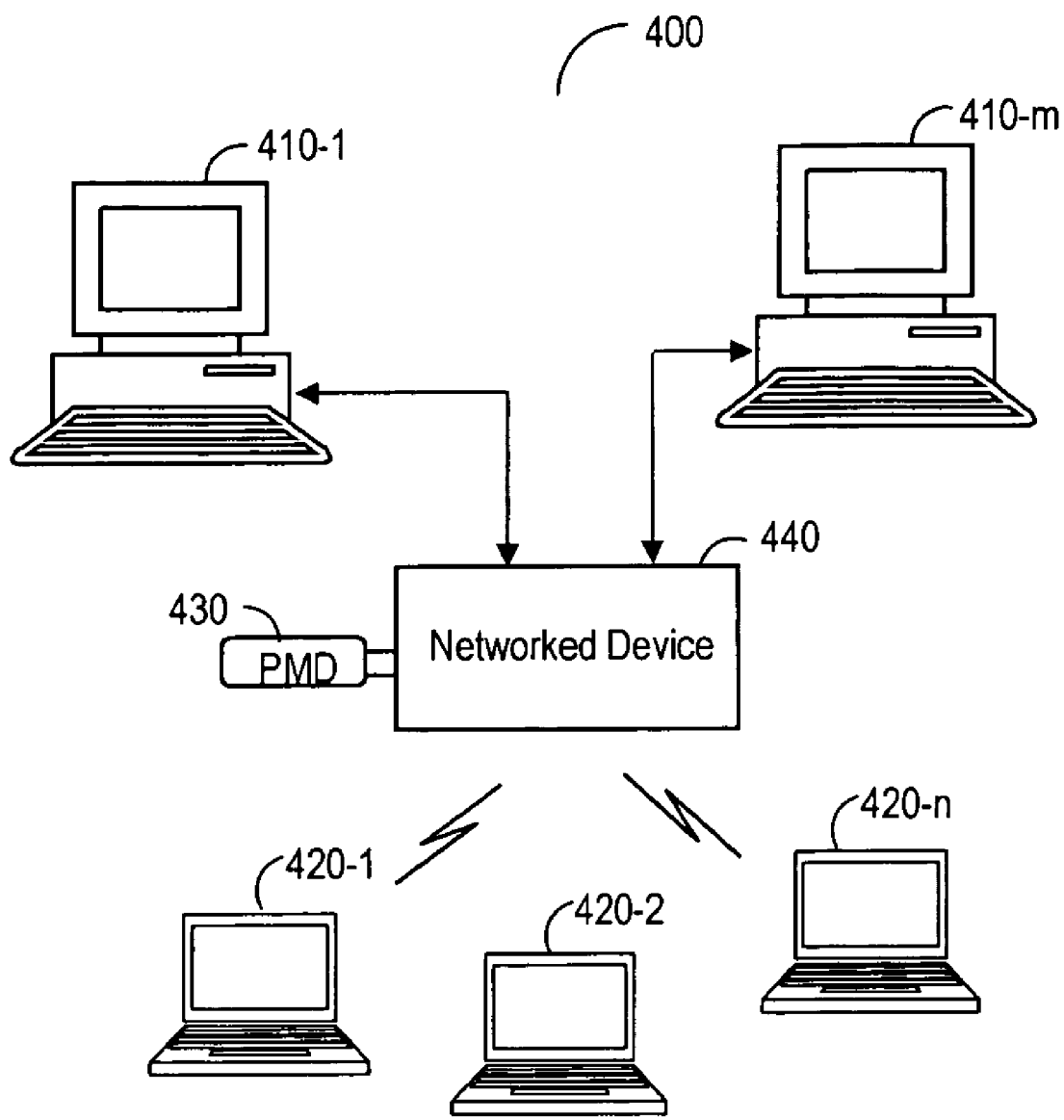
FIG. 4 is a non-limiting diagram of a computer network illustrating the execution of software applications on a personal memory device by the computing devices connected in the network according to an embodiment of the present invention.

In a preferred embodiment, applications residing on the PMD can be executed simultaneously on plurality of computing devices. In such embodiment, as depicted in FIG. 4, the PMD 430 is plugged into a networked device 440 operating in a network 400. The networked device 440 is connected to a plurality of computing devices 420 that are part of network 400. The computing devices 420 including, but not limited to, personal computers (PCs), personal digital assistants (PDAs), handheld and notebook computers, any other type of handheld or personal wireless electronic device. The network 400 is a local area network (LAN), a wireless LAN (WLAN) or combination thereof. The WLAN may be based on the IEEE 802.11 standard, WiFi, Bluetooth, infrared or other suitable networking standards and methodologies. The networked device 440 comprises at least one port (not shown) that is compatible with the connector of the PMD 430, e.g., a USB port. The networked device may be, but is not limited to, a wired router, a wireless router, a switch, and similar devices.

Once the PMD 430 is plugged into networked device 440, each of computing devices 420 can access and run the applications resides in the PMD 430. This is performed without installing any application on the computing device 420. It would be appreciated by a person skilled in the art that this solution would eliminate the need from a user (e.g., a system administrator) to install and configure each computing device 420 with the applications resides in the PMD 430.

In an embodiment of the present invention, some or all of the method components are implemented as a computer executable code. Such a computer executable code contains a plurality of computer instructions that when performed in a predefined order result with the execution of the tasks disclosed herein. Such computer executable code may be available is source code or in object code, and may be further comprised as part of, for example, a portable memory device or downloaded from the Internet.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A method comprising:
providing a portable memory device with at least a virtual registry file and execution files associated with a software application, wherein the virtual registry file is derived from a system registry file in a first computing device, configured to allow execution of the software application in the portable memory device, and generated by monitoring registry values written to the system registry file while the software application is installed in the first computing device, and wherein the registry values are simultaneously time written to the virtual registry file;
upon plugging the portable memory device to the second computing device, automatically uploading personalized information to the second computing device;
mapping system calls to access the execution files and the virtual registry file stored in the portable memory device, wherein the mapping system calls comprises searching the virtual registry file for a value of a key or sub-key in response to an operating system request for the value of the key or sub-key, and searching a system registry file in the second computing device for the value of the key or sub-key if the value of the key or sub-key is not found in the virtual registry file, wherein the virtual registry file determines which keys or sub-keys to superimpose in the system registry file of the second computing device;
executing the software application in the portable memory device by the second computing device;
upon disconnecting the portable memory device form the second computing device, removing the personalized information and residual data from the second computing device; and
returning system registry values in the system registry file of the second computing device to a previous setting.

2. The method of claim 1, wherein said virtual registry file comprises at least system information for the operating system to execute the software application, wherein the virtual registry file includes a hierarchy of keys, sub-keys and values.

3. The method of claim 1, wherein an execution file is at least one of an EXE file, a DLL file, a SYS file and a data file.

4. The method of claim 3, wherein the system calls are requests generated by at least an operating system on the second computing device.

5. The method of claim 4, further comprising accessing the system registry file in the second computing device if a system call can not be served by the execution files and the virtual registry file.

6. The method of claim 1, wherein the second computing device comprises at least a data bus compatible with the portable memory device.

7. The method of claim 6, wherein the data bus is at least one of a universal serial bus, a parallel bus and a peripheral component interconnect bus.

8. The method of claim 1, wherein the second computing device is at least one of a personal computer, a personal digital assistant, a hand held computer, a notebook computer and a networked device.

9. The method of claim 8, wherein the networked device is at least one of a wired router, a wireless router and a switch.

10. A computer program product stored in the portable memory device being configured to execute code capable of:
providing the portable memory device with at least a virtual registry file and execution files associated with a software application, wherein the virtual registry file is derived from a system registry file in a first computing device, configured to allow execution of the software application in the portable memory device, and generated by monitoring registry values written to the system registry file while the software application is installed in the first computing device, and wherein the registry values are simultaneously time written to the virtual registry file;
upon plugging the portable memory device to the second computing device, automatically uploading personalized information to the second computing device;
mapping system calls to access the execution files and the registry file stored in the portable memory device, wherein the mapping system calls comprises searching the virtual registry file for a value of a key or sub-key in response to an operating system request for the value of the key or sub-key, and searching a system registry file in the second computing device for the value of the key or sub-key if the value of the key or sub-key is not found in the virtual registry file, wherein the virtual registry file determines which keys or sub-keys to superimpose in the system registry file of the second computing device;
executing the software application in the portable memory device by the second computing device;
upon disconnecting the portable memory device form the second computing device, removing the personalized information and residual data from the second computing device; and
returning system registry values in the system registry file of the second computing device to a previous setting.

11. The computer program product of claim 10, wherein the virtual registry file comprises at least system information for the operating system to execute the software application, wherein the virtual registry file includes a hierarchy of keys, sub-keys and values.

12. The computer program product of claim 10, wherein an execution file is at least one of an EXE file, a DLL file, a SYS file and a data file.

13. The computer program product of claim 10, wherein the system calls are requests generated by at least an operating system on the second computing device.

14. The computer program product of claim 13, wherein the executable code is further capable of accessing the system registry file in the second computing device if a system call can not be served by the execution files and the virtual registry file.

15. The computer program product of claim 10, wherein the second computing device comprises at least a data bus compatible with the portable memory device.

16. A portable memory device comprises:
a non-volatile memory containing at least a virtual registry file and execution files associated with a software application, wherein the virtual registry file is derived from a system registry file in a first computing device, configured to allow execution of the software application in the portable memory device, and generated by monitoring registry values written to the system registry file while the software application is installed in the first computing device, and wherein the registry values are simultaneously time written to the virtual registry file;

an initiator code containing executable code that automatically run a predetermined application upon plugging the portable memory device to the second computing device, wherein the initiator code is configured to map system calls to access the execution files and the virtual registry file when the portable memory device is plugged into the second computing device, and being configured to map the system calls to include searching the virtual registry file for a value of a key or sub-key in response to an operating system request for the value of the key or sub-key, and searching a system registry file in the second computing device for the value of the key or sub-key if the value of the key or sub-key is not found in the virtual registry file, wherein the virtual registry file determines which keys or sub-keys to superimpose in the system registry file of the second computing device;

the non-volatile memory being configured to execute the software application in the portable memory device by the second computing device;

the non-volatile memory being configured to return system registry values to a previous setting in the system registry file of the second computing upon being unplugged from the second computing device; and a data bus interface compatible with the second computing device.

17. The portable memory device of claim 16, wherein the data bus is at least one of a universal serial bus, a parallel bus and a peripheral component interconnect bus.

18. The portable memory device of claim 16, wherein the second computing device is at least one of a personal computer, a personal digital assistant, a handheld computer, a notebook computer and a networked device.

19. The portable memory device of claim 18, wherein the networked device is at least one of a wired router, a wireless router and a switch.

20. The portable memory device of claim 16, wherein the virtual registry file comprises at least system information for the operating system to execute the software application, wherein the virtual registry file includes a hierarchy of keys, sub-keys and values.

21. The portable memory device of claim 16, wherein an execution file is at least one of an EXE file, a DLL file, a SYS file and a data file.

22. The portable memory device of claim 16, wherein executing the software application further comprises accessing the system registry file in the second computing device if a system call can not be served by the execution files and the virtual registry file.

23. The portable memory device of claim 22, wherein the system calls are requests generated by at least an operating system on the second computing device.

* * * * *